US007604540B2

(12) United States Patent
Olive

(10) Patent No.: US 7,604,540 B2
(45) Date of Patent: Oct. 20, 2009

(54) LINKED PROGRESSIVE JACKPOT SYSTEM

(75) Inventor: Scott Olive, Balgowlah (AU)

(73) Assignee: Aristocrat Technologies Australia Pty Ltd (AU)

( * ) Notice: Subject to any disclaimer, the term of this patent is extended or adjusted under 35 U.S.C. 154(b) by 51 days.

(21) Appl. No.: 11/654,142

(22) Filed: Jan. 16, 2007

(65) Prior Publication Data

US 2007/0117607 A1 May 24, 2007

Related U.S. Application Data

(63) Continuation of application No. 10/366,488, filed on Feb. 12, 2003, now abandoned.

(30) Foreign Application Priority Data

Feb. 12, 2002 (AU) ..................................... PS0501

(51) Int. Cl.
*A63F 13/00* (2006.01)

(52) U.S. Cl. .............................. 463/27; 463/20; 463/21

(58) Field of Classification Search .................. 463/16, 463/20, 25–27, 42, 21; 273/138.1, 138.2
See application file for complete search history.

(56) References Cited

U.S. PATENT DOCUMENTS

| | | | | |
|---|---|---|---|---|
| 5,564,700 | A | 10/1996 | Celona | |
| 5,769,716 | A | 6/1998 | Saffari et al. | |
| 5,833,537 | A * | 11/1998 | Barrie | 463/21 |
| 5,833,538 | A | 11/1998 | Weiss | |
| 5,833,540 | A | 11/1998 | Miodunski et al. | |
| 5,876,284 | A | 3/1999 | Acres et al. | |
| 5,947,820 | A | 9/1999 | Morro et al. | |
| 5,997,401 | A * | 12/1999 | Crawford | 463/20 |
| 6,068,552 | A | 5/2000 | Walker et al. | |
| 6,117,013 | A | 9/2000 | Eiba | |
| 6,146,273 | A | 11/2000 | Olsen | |
| 6,224,484 | B1 | 5/2001 | Okuda et al. | |

(Continued)

FOREIGN PATENT DOCUMENTS

EP 1 063 622 A2 12/2000

(Continued)

OTHER PUBLICATIONS

Mills, H.S. (1979). *Slot Machines of Yesteryear: Operator's Companion*. Post-Era Books: Arcadia, CA, pp. 22, 23, 124, 125.

*Primary Examiner*—Peter DungBa Vo
*Assistant Examiner*—William H McCulloch
(74) *Attorney, Agent, or Firm*—McAndrews, Held & Malloy, Ltd.

(57) ABSTRACT

A gaming machine 10 has a display 14 and a game controller arranged to control images of symbols displayed on the display 14. The game controller is arranged to play a game 16 in which at least one random event is caused to be displayed on the display 14. If a predefined winning event occurs, the machine 10 awards a prize to a player. When a trigger condition occurs in a base game of the game 16, a bonus game feature is awarded comprising a series of bonus games. If a particular special symbol outcome occurs during any of the bonus games, the particular special symbol outcome is collected towards a jackpot prize awarding event.

10 Claims, 15 Drawing Sheets

U.S. PATENT DOCUMENTS

| | | | | |
|---|---|---|---|---|
| 6,311,976 | B1 | 11/2001 | Yoseloff et al. | |
| 6,645,073 | B2 | 11/2003 | Lemay et al. | |
| 6,726,563 | B1 | 4/2004 | Baerlocher et al. | |
| 6,726,565 | B2 | 4/2004 | Hughs-Baird | |
| 6,869,361 | B2 | 3/2005 | Sharpless et al. | |
| 6,875,108 | B1 | 4/2005 | Hughs-Baird | |
| 6,932,702 | B1 | 8/2005 | Harris | |
| 7,029,395 | B1 * | 4/2006 | Baerlocher | 463/20 |
| 7,048,628 | B2 | 5/2006 | Schneider | |
| 7,326,109 | B2 * | 2/2008 | Baerlocher | 463/16 |
| 7,374,486 | B2 * | 5/2008 | Baerlocher | 463/20 |
| 2002/0010017 | A1 | 1/2002 | Bennett | |
| 2002/0039923 | A1 * | 4/2002 | Cannon et al. | 463/42 |
| 2002/0078088 | A1 | 6/2002 | Kuruoglu et al. | |
| 2003/0040355 | A1 * | 2/2003 | Baerlocher | 463/20 |
| 2003/0069064 | A1 | 4/2003 | Ainsworth | |

FOREIGN PATENT DOCUMENTS

| | | |
|---|---|---|
| EP | 1063622 | 12/2000 |
| WO | 1999010849 | 3/1999 |
| WO | WO-99/10849 A1 | 3/1999 |

* cited by examiner

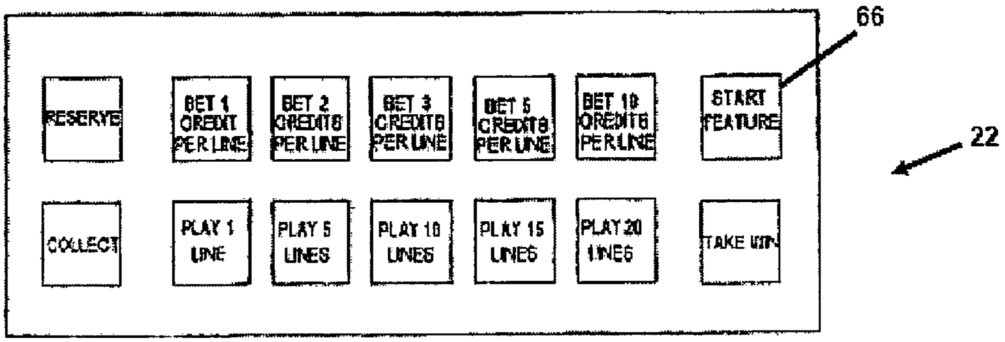
*Fig. 12*
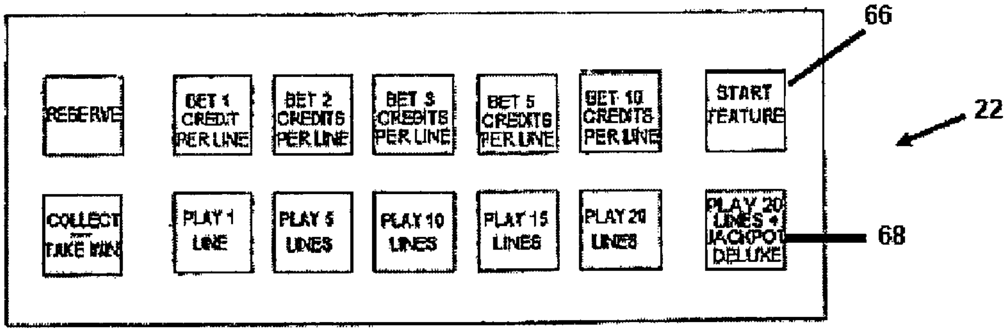
*Fig. 15*
60
| NUMBER OF CLEOPATRAS | Bet 3 Path X |
|---|---|
| 1 | 15 |
| 2 | GRAND |
| 3 | MINOR |
| 4 | MINOR |
| 5 | MINOR |
| | ...etc |
*Fig. 13*

LINKED PROGRESSIVE JACKPOT SYSTEM

CROSS REFERENCE TO RELATED APPLICATION

This application is a continuation of U.S. Ser. No. 10/366,488, filed on Feb. 12, 2003,which claims priority to Australian Provisional Patent application No. PS0501 filed Feb. 12, 2002, and is related to co-pending U.S. Patent Application filed Feb. 12, 2003 entitled "Gaming Machine Pathways With Unpredictable Outcome" which claims priority to Australian Provisional Patent Application No. PS0502 filed Feb. 12, 2002, and each of which is incorporated herein by reference in its entirety.

FIELD OF THE INVENTION

This invention relates to a gaming machine. More particularly, the invention relates to a gaming machine, to an improvement to a game played on such a gaming machine and to a system including a plurality of linked gaming machines.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

A linked progressive system is one where a plurality of gaming machines are linked via a network to a central controller. The linked gaming machines or the central controller allow players of those machines to compete for a jackpot prize. The jackpot prize is progressive in the sense that it increments as a percentage of turnover, ie. bets wagered by players of the linked machines.

SUMMARY OF THE INVENTION

According to a first aspect of the invention, there is provided a gaming machine having a display means and a game control means arranged to control images of symbols displayed on the display means, the game control means being arranged to play a game in which at least one random event is caused to be displayed on the display means and, if a predefined winning event occurs, the machine awards a prize to a player, wherein, when a trigger condition occurs in a base game, a bonus game feature is awarded comprising a series of bonus games and, if a particular special symbol outcome occurs during any of the bonus games, the particular special symbol outcome is collected towards a jackpot prize awarding event.

When the feature occurs, the control means may pre-select a set of special symbol outcomes depending on the magnitude of a bet made by the player.

According to a second aspect of the invention, there is provided a gaming machine having a display means and a game control means arranged to control images of symbols displayed on the display means, the game control means being arranged to play a game in which at least one random event is caused to be displayed on the display means and, if a predefined winning event occurs, the machine awards a prize, wherein, when a trigger condition occurs in a base game, a bonus game feature is awarded comprising a plurality of bonus games in which special symbols occur that result in special symbol outcomes and, when the feature occurs, the control means pre-selects a set of special symbol outcomes depending on the magnitude of a bet made by a player.

The special symbol outcome may follow automatically after occurrence of a special symbol. Instead, and preferably, the special symbol outcome occurs only when the special symbol is acted on by the player. For example the special symbol may be touched by the player to cause it to be transformed into the special symbol outcome. The transformation of the special symbol may take place by way of an animation.

In this specification, the term "special symbol outcome" means, unless the context clearly indicates otherwise, a type of bonus symbol or symbol contributing to a bonus as represented by the special symbol.

The bonus game feature may comprise a free game sequence of a predetermined number of free games, for example, fifteen free game, the free games being awarded when a predetermined scatter symbol trigger combination occurs in the base game.

In addition, if, during the playing of the bonus game feature, the scatter symbol trigger combination re-occurs it may result in a further bonus game feature. This means that an additional sequence of free games may be added to any remaining free games from the preceding bonus game feature. It will be appreciated that such a re-triggering could occur an indefinite number of times.

Further, it will be appreciated that, in the playing of free games generally, the reel combinations for the free games are randomly determined by the control means as the free games progress and hence it is impossible to know how many special symbols will be revealed in the bonus game feature prior to commencement of the bonus game feature.

The special symbol outcome may be a bonus symbol, being one of a bonus credit prize, a bonus feature and a jackpot symbol contributing to the awarding of a jackpot. In the playing of the free games, when a predetermined special symbol appears on any one of the reels and is displayed on the display means, that special symbol may animate to reveal one of a bonus credit prize, a bonus feature and one of a plurality of jackpot symbols. Predetermined categories of jackpot prizes, with their associated jackpot symbols, may be provided being a mini jackpot, a minor jackpot, a major jackpot and a grand jackpot. Thus, the jackpot symbols may be a mini jackpot symbol, a minor jackpot symbol, a major jackpot symbol and a grand jackpot symbol.

To make the chance of winning a jackpot prize proportional to a bet wagered by the player without altering the reel strips for the free game, the probabilities of the special symbol outcomes may be altered by the control means, depending upon the bet made on the triggering game.

To achieve this, the special symbol outcomes may be arranged in sets, the special symbol outcomes being arranged in a predetermined order within the set. The arranging of the special symbol outcomes in a set is referred to in this specification as a "pathway".

Groups of pathways may be associated with each bet. Accordingly, when the player places his or her bet, the control means may record the size of the bet made by the player.

If the base game played triggers the bonus game feature, the control means may randomly select one of the pathways from the group associated with the bet that was made on the base game prior to the occurrence of the trigger condition. In so doing, the unpredictability of the game is increased.

Due to the fact that re-triggering of the bonus game feature may occur in the playing of any free game sequence, each pathway may need to supply a sufficiently long sequence of special symbol outcomes to cover any number of special symbols spun up during the playing of the free game. Typically, each pathway may have a sequence of 100 special symbol outcomes.

It will be appreciated that, in a five reel spinning game where only one special symbol can be displayed on any one reel at any one time, a maximum of 75 symbols can occur in a 15 game free game sequence. However, with re-triggers this may increase to a figure exceeding 100 although the probabilities of such an occurrence are vanishingly small. Nevertheless, to cater for such an eventuality, in respect of each pathway, a special symbol outcome of a fixed, low-value prize may be associated with any special symbol that occurs after a predetermined number of positions in the pathway of special symbol outcomes. For example, a fixed, low-value prize may be awarded for any position in the pathway after the 100th position.

Access to the progressive jackpot feature of the machine, or the system referred to below, as the case may be, may occur without the need for any additional wager by the player. Instead, if the player wishes to access a progressive jackpot feature of the bonus game feature, an additional wager may have to be staked by the player. If the additional wager is not staked and the bonus game feature is triggered, then any special symbol spun up during the bonus game feature may not be active. In other words, the special symbols may not be responsive to being acted on by the player to reveal a special symbol outcome. The special symbol may merely serve a conventional function such as a wild card symbol.

In a basic form of the invention the gaming machine may be a stand-alone unit having a stand-alone progressive jackpot. However, the applicant envisages that the invention will be employed particularly on linked gaming machines having a linked progressive jackpot.

Accordingly, the invention extends to a system including a plurality of linked gaming machines as described above.

The base games of the gaming machines may have certain aspects in common. Each base game may be a spinning reel game, being a five reel spinning reel game, where, if a predetermined trigger condition occurs, a bonus game feature is awarded. However, the base games may differ thematically and/or mathematically from each other. Further, the invention encompasses within its scope different styles of base games, such as card games, ball games (keno, pachinko, etc.), or the like being used

BRIEF DESCRIPTION OF THE DRAWINGS

The invention is now described by way of example with reference to the accompanying diagrammatic drawings in which:

FIGS. 8*a* and 8*b* show the top box display after certain of the symbols have been acted on;

FIG. 10 shows a screen display of the free game of FIG. 9 after certain of the special symbols have been acted on;

FIG. 12 shows a keypad layout on a midtrim of the gaming machine for a first embodiment of the game;

FIG. 13 shows a part of a pathway used in the game;

FIG. 15 shows a keypad layout on a midtrim of the gaming machine for a second embodiment of the game.

DETAILED DESCRIPTION OF THE DRAWINGS

Figure 1:
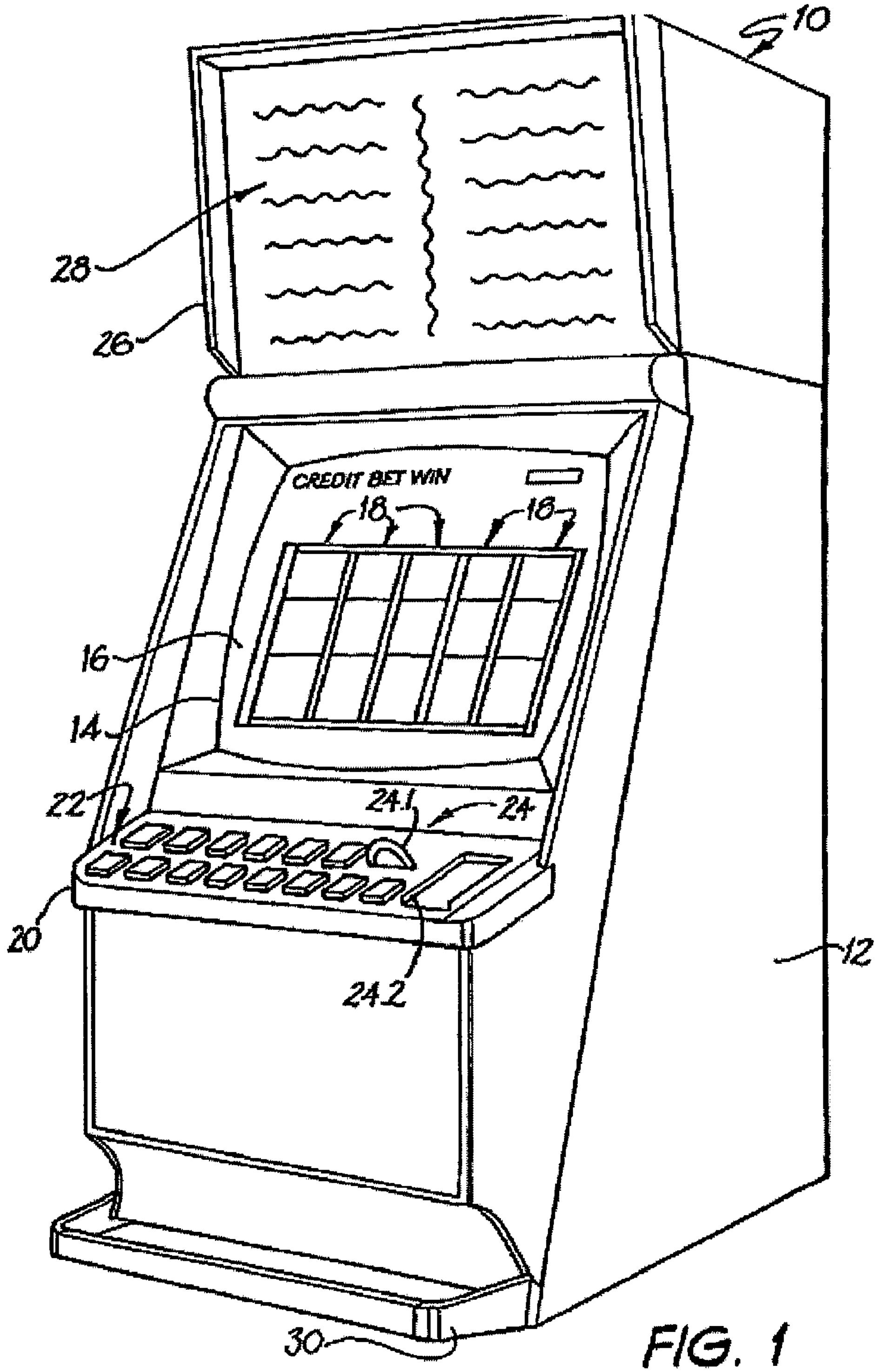
FIG. 1 shows a perspective view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2.

Figure 4:
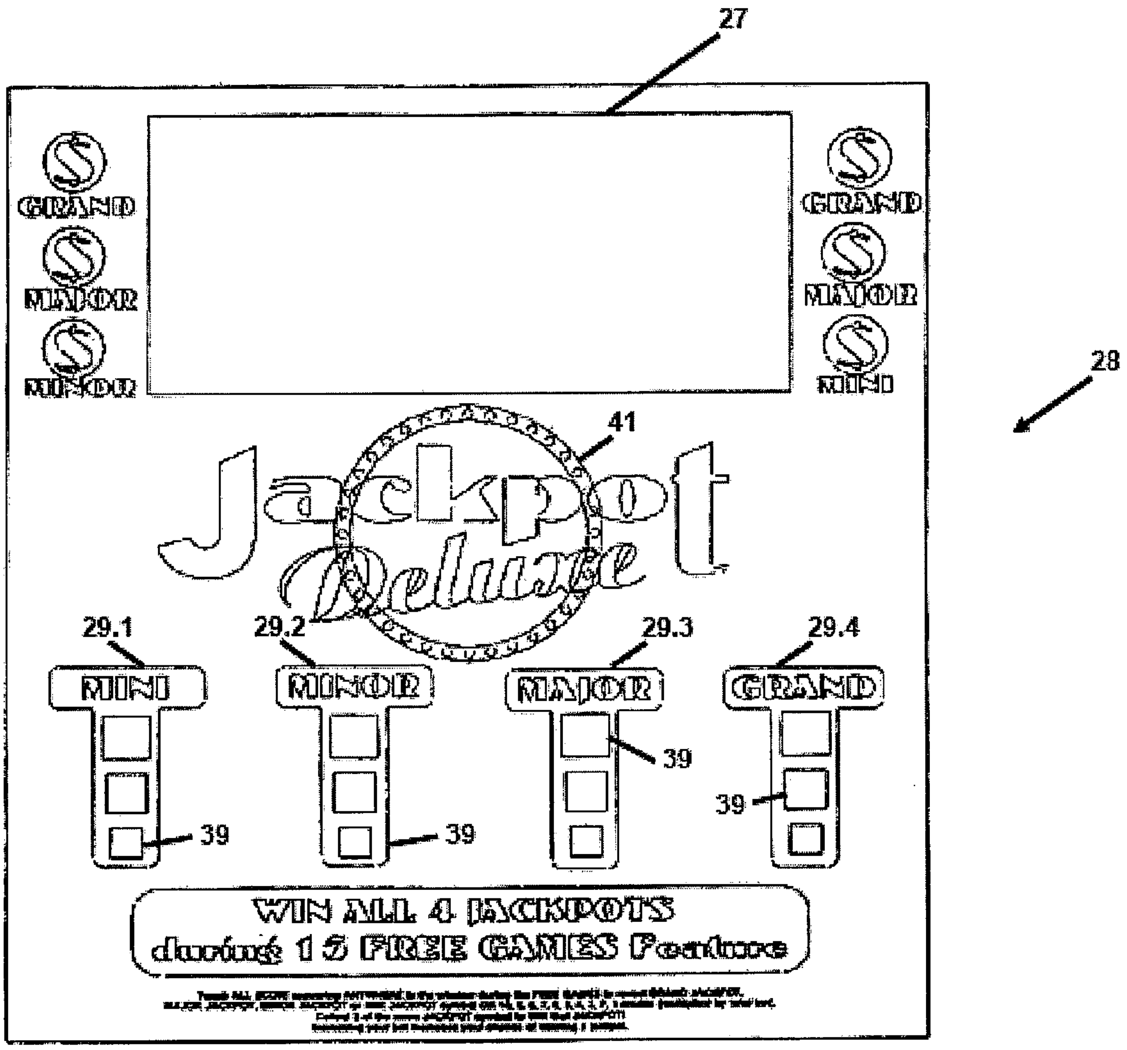
FIG. 4 shows a schematic diagram of top box art work of the gaming machine of FIG. 1.

The machine 10 includes a top box 26 on which artwork 28 is carried. The artwork 28 is shown, inter alia, in FIG. 4 of the drawings. It includes a backlit section 27 which is illuminated when a jackpot feature of the game, as will be described in greater detail below, is activated. The section 27 is a display area such as an LED or plasma display. Progressive meters of jackpot prizes or awards are displayed in this section 27. The top box 26 and artwork 28 also have parts 29.1, 29.2, 29.3 and 29.4 related to the possible jackpot prizes which can be won. Each part 29.1-29.4 contains an illuminated display, such as an LED display comprising three LED's 39, the LED's 39 being illuminated consecutively as the appropriate special symbol outcome occurs as will be described below. An annunciator 41, in the form of an annulus of LED's, is provided on the top box 26, the annunciator being activated when a feature is triggered.

A coin tray 30 is mounted beneath the console 12 for cash payouts from the machine 10.

Figure 2:
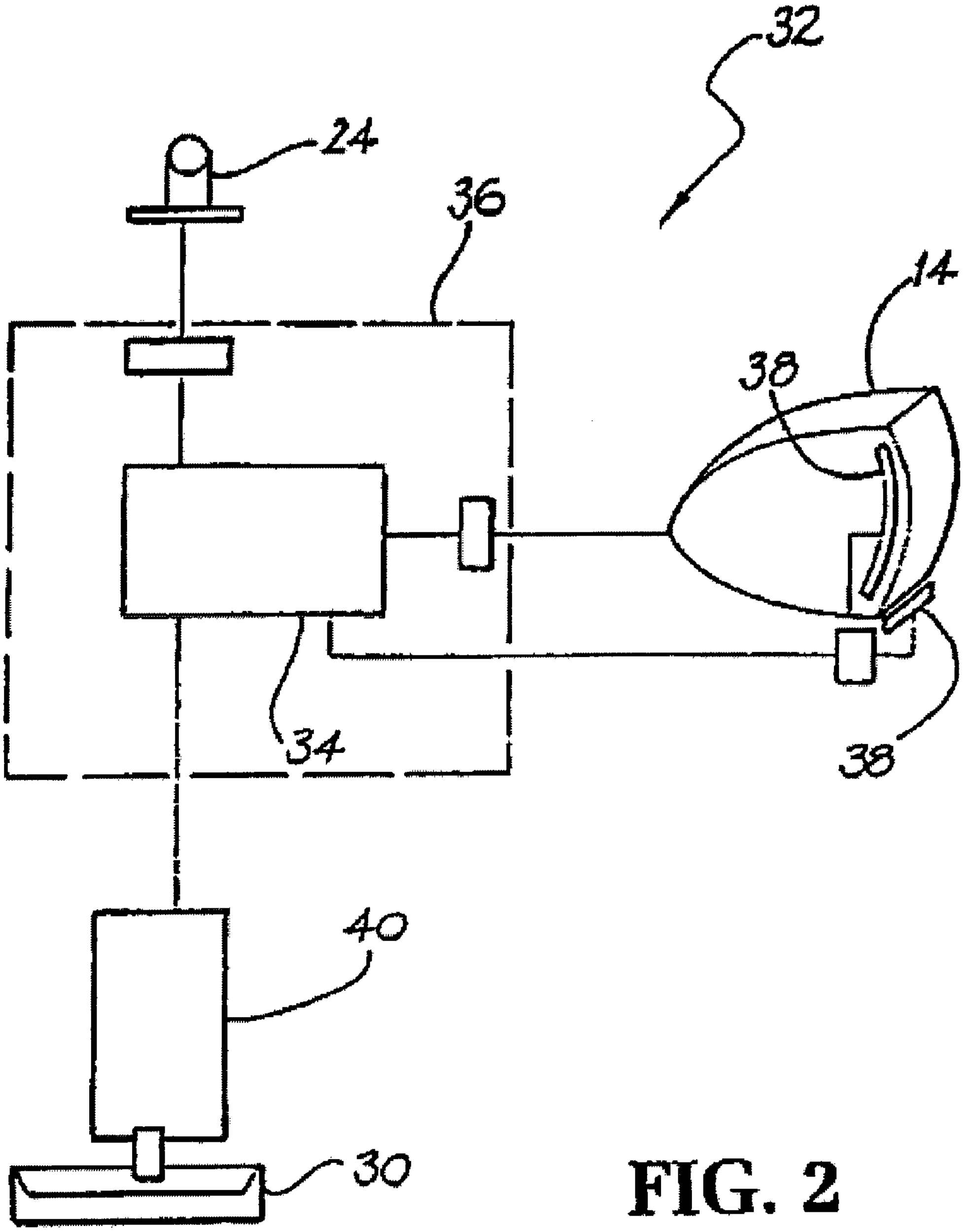
FIG. 2 shows a block diagram of a control circuit of the gaming machine.

Referring now to FIG. 2 of the drawings, a control means or control circuit 32 is illustrated. A program which implements the game and user interface is run on a processor 34 of the control circuit 32. The processor 34 forms part of a controller 36 which drives the screen of the video display unit 14 and which receives input signals from sensors 38. The sensors 38 include sensors associated with the bank 22 of buttons and touch sensors mounted in the screen of the video display unit 14. The controller 36 also receives input pulses from the mechanism 24 to determine whether or not a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

Figure 3:
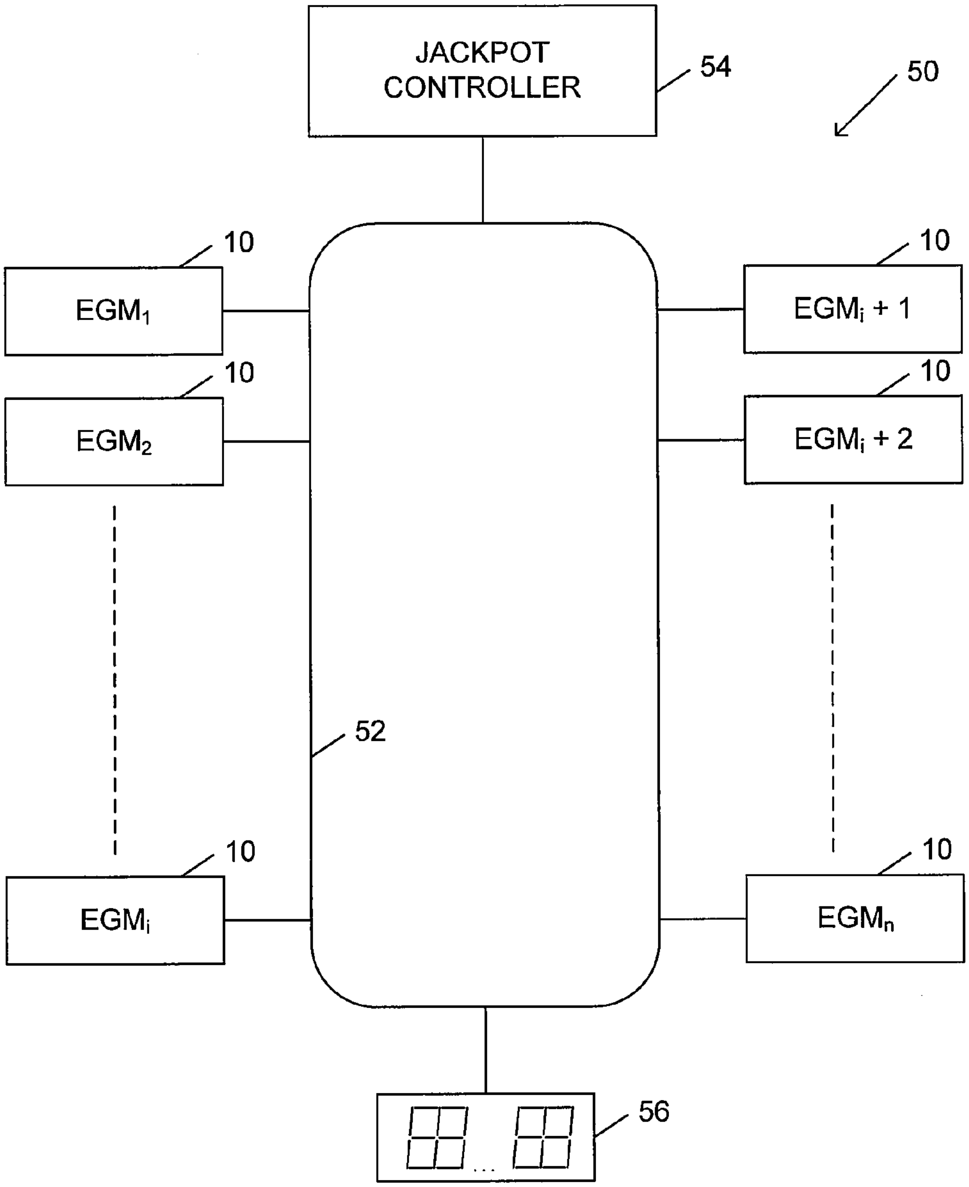
FIG. 3 shows a block diagram of a system, also in accordance with the invention, of a plurality of linked gaming machines.

The game, in accordance with the invention, can be played on a stand alone gaming machine 10 as illustrated in FIG. 1 of the drawings. However, preferably, the game is played on a gaming machine linked together in a system 50 (FIG. 3). The system 50 comprises a plurality of linked gaming machines 10 which are each connected to a network 52. A jackpot controller 54 is also connected to the network 52 as is a grand jackpot display 56. It will be appreciated that each of the gaming machines 10, in their top boxes 26, have jackpot displays which indicate the status of the jackpots of the system. In this regard, it is to be noted that the system awards four jackpots being a mini jackpot, a minor jackpot, a major jackpot and a grand jackpot, the value of each of which is displayed on the display 56 of the system 50.

The system 50 works on the basis that a predetermined percentage of turnover from each gaming machine 10 contributes to a common jackpot pool maintained by the jackpot controller 54 and from which the jackpots are derived.

Each gaming machine 10 has its own game 16 which may differ thematically and/or mathematically from each other. However, each of the games will have certain aspects in common.

Each game 16, more particularly, comprises a five reel spinning reel game having a predetermined trigger condition. The trigger condition triggers the awarding of a bonus game feature where fifteen free games are awarded. The trigger condition is, for example, the occurrence of a predetermined number of scatter symbols anywhere on the display of the video display unit 14.

The game 16 on each gaming machine 10 further includes a predetermined special symbol on each of the reels 18 where, during the fifteen free games, every time that special symbol appears a player will touch the special symbol on the screen and, by way of the sensors 38 sending appropriate signals to the controller 36, the special symbol animates to reveal either a prize amount or a jackpot symbol.

If a prize amount is revealed from one of the special symbols, that prize is paid to a win meter 56 on a screen display 58 of the game 16 on that gaming machine 10. If a jackpot symbol of one of the mini, minor, major or grand jackpots is revealed then it will be collected along with all other jackpot symbols from that free game series and the appropriate LED's 39 in the top box 26 will be energised.

With free game features, the free game feature is triggered by the occurrence of three or more scatter symbols on the screen display 58 of the base game and therefore the chance of triggering the series of free games is the same regardless of the amount bet. To make the chance of winning a jackpot prize proportional to the bet without altering the reel strips for different bets during the free games, the probabilities for the special symbol outcomes can be altered by the controller 36 depending on the bet made on the triggering game. To enable the controller 36 to alter the probabilities for the special symbol outcomes, a number of predetermined pathways is defined for every possible bet that can be made on the gaming machine 10. In this regard, it will be borne in mind that, as shown in FIG. 12 of the drawings, a player can play one or more lines of the spinning reel base game 18 and can bet one or more credits per line. For the configuration shown in FIG. 12 of the drawings, there are 17 different bet combinations which can be employed, bearing in mind that, in respect of some combinations of bet per line and number of lines to play, the total amounts bet are the same.

As indicated, a predetermined number of pathways is associated with each bet. More particularly, each bet has fifty pathways associated with it.

Each pathway, a part of one of which is shown in FIG. 13 of the drawings and designated generally by the reference numeral 60, defines a sequence of random prize amounts and jackpot symbols in the order in which they will be revealed when the player activates a special symbol during the free game. Thus, when the free games are triggered, a pathway 60 is randomly selected from the number of predetermined pathways associated with that bet, the bet having been made on the base game. The free games. proceed randomly as for a standard free game sequence except that the outcomes of the special symbols are predetermined by the selected pathway.

Further, it is to be noted that, the higher the bet, the greater the probability of achieving larger prizes and of achieving one or more of the jackpot prizes. It is also to be noted that, in any free game sequence, more than one jackpot type could be won. Due to the layout of each pathway in this particular embodiment of the invention, it is not possible to win the same type of jackpot prize more than once in any free game sequence. However, by varying the composition of the pathways 60, it may be possible to win the same type of jackpot more than once.

Because the reel combinations for the free games are randomly determined by the controller 36 as the free games progress, it is impossible to know how many special symbols will be revealed prior to commencement of the free games. Consequently, each pathway 60 provides a long enough sequence of special symbol outcomes to cover any number of special symbols that could occur in a free game sequence. In this regard, it is theoretically possible in any one free game sequence for a maximum of 75 special symbol outcomes to be revealed bearing in mind that only one special symbol at a time could be displayed on each reel 18. It is also possible that, during a free game, the trigger condition again occurs. When that happens, a further free game sequence is added to the remaining free games from the preceding sequence so that, theoretically, it is possible for there to be more than 75 special symbol outcomes in a concatenation of free game features. To cater for such a situation, however small the possibility of the occurrence of such a situation, each pathway 60, after the hundredth occurrence of the special symbol, provides for a fixed, low value prize.

When determining the jackpot return, arbitrary probabilities for awarding each level of progressive jackpot, ie the mini jackpot, the minor jackpot, the major jackpot or the grand jackpot, occurring during the free games for the maximum bet are assigned. For example, when betting two hundred credits, there may be a 50% chance of obtaining the minor jackpot when in the free game feature. The equivalent probabilities proportional to each one of the seventeen total bets can then be determined. Therefore, betting one hundred credits there will only be half the chance of winning each jackpot than there is when betting two hundred credits. Thus, there would only be a 25% chance of winning the minor jackpot.

Once the probabilities of winning the different levels of jackpots have been determined for each bet, the pathways 60 associated with each bet can be determined. Each pathway 60 associated with each bet provides a predefined sequence of prize values and jackpot symbols that will be revealed as special symbol outcomes when the special symbols appear and are acted on by the player in the free games. It is to be noted that the outcome of the free games is still random in that the stopping positions of each of the reels is randomly selected for each of the free games by the controller 36 but the outcome for each special symbol that appears will be predetermined due to the selection of one of the pathways 60. The pathways 60 are determined such that the average probability of winning each of the jackpots across the pathways 60 applicable to the bet is the required probability for that jackpot at that bet. The bonus prizes that are revealed along the pathway 60 when jackpot symbols are not revealed will be such that the average return to player contributed by the prizes across the pathways 60 applicable to the bet is the same for every possible total bet. Because the position of the jackpot symbols in the pathways 60 will be different for different bets to compensate for the change in probability of winning a jackpot, the random bonus prizes have to be independently calculated for every pathway 60 of every total bet.

The invention is now described with reference to a modified version of the Applicant's Queen of the Nile™ spinning reel game. This game includes special symbols on the reel strips as follows:

CLEOPATRA—is a substitute symbol. It substitutes for all symbols except scatters. All combinations in which one or more CLEOPATRA symbols substitute are doubled. The CLEOPATRA symbol is also the special bonus symbol during the free game sequence. The CLEOPATRA symbol is designated by the symbol W 62 in the drawings.

PYRAMID—is the scatter symbol and is also the free game trigger symbol. When three or more PYRAMIDS appear on the screen fifteen free games are awarded during which all wins are trebled. Further, if three or more PYRAMIDS occur during any free game in the free game sequence a further free game sequence is awarded and added to the remaining free games from the preceding sequence. The PYRAMID symbol is represented by the symbol S 64 in the drawings.

Figure 5A:
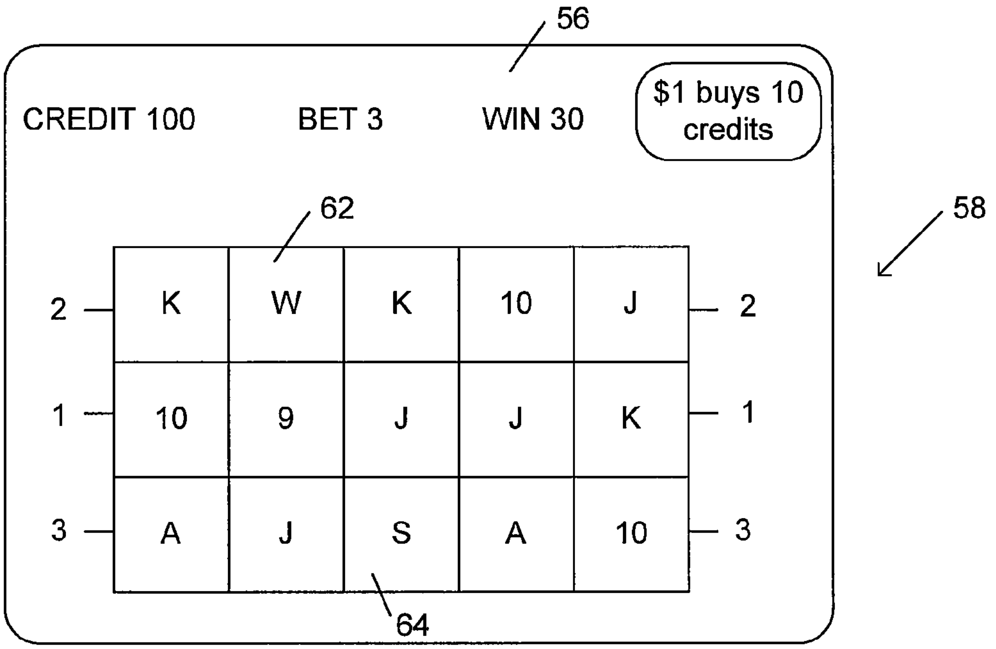
FIGS. 5*a* and 5*b* show screen displays of two base games of a game played on the gaming machine or one of the gaming machines of the system.

A typical base game result is shown in FIG. 5*a* of the drawings. In this game it is assumed that payline symbols only pay for left-to-right combinations. As a result, the only prize is for the 3×K combination, left-to-right, on payline 2. Due to the presence of the CLEOPATRA symbol 62, the win is doubled so that thirty credits are awarded and credited to the win meter 56.

Figure 5B:
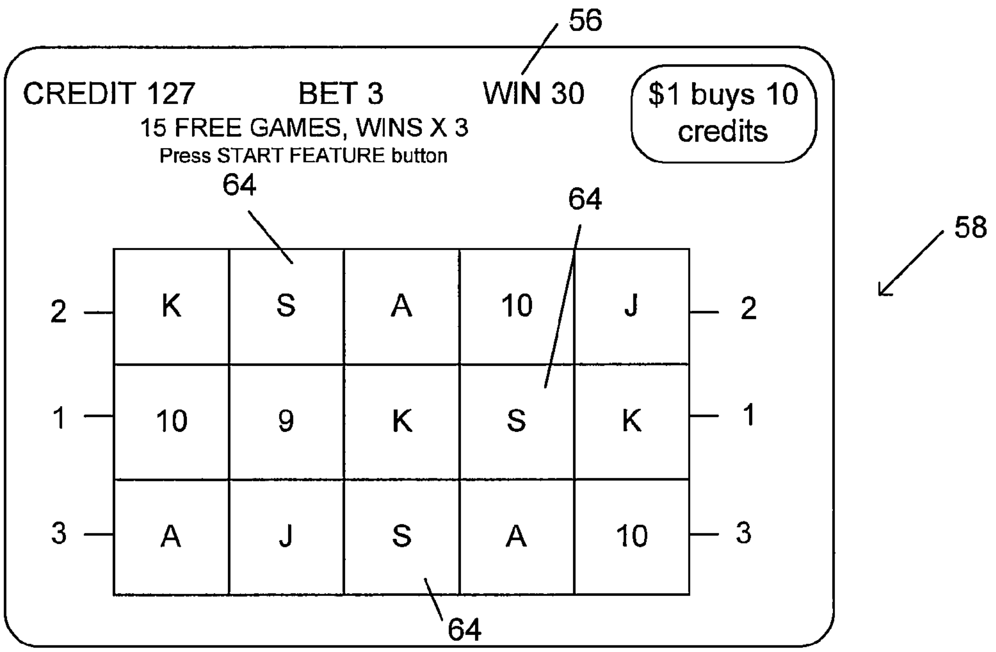

In the next base game, as shown in FIG. 5*b* of the drawings, three PYRAMID symbols 64 are spun up resulting in a further win of thirty credits for 3×PYRAMID symbol 64. This is the trigger condition for a sequence of fifteen free games during which the progressive jackpot feature is applicable.

The player is alerted to the triggering of the feature by the animation of the artwork 28 in the top box 26. More particularly, the annunciator 41 is activated to flash along with special sound effects to indicate that the feature has been triggered. To commence with the feature, a "Start Feature" button 66 on the bank 22 of buttons is pressed. As indicated above, all wins in the free game feature are trebled. At this point, the controller 36 selects one of the pathways from the pathways that apply to the particular bet made by the player at the commencement of the triggering game.

Figure 6:
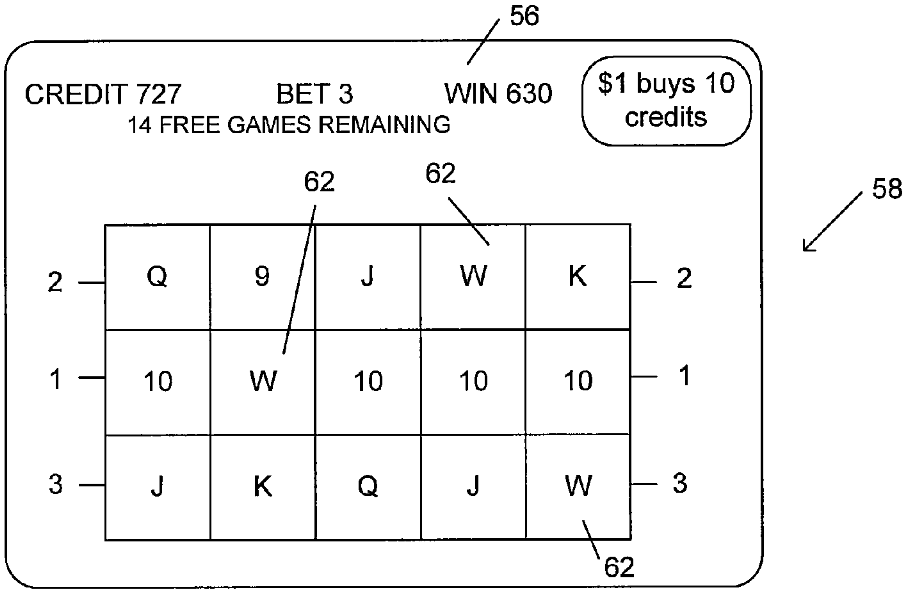
FIG. 6 shows a screen display of an initial free game of a free game feature.

A result of the first game of the sequence of free games is shown in FIG. 6 of the drawings. It is to be noted that the CLEOPATRA symbol 62 still functions as a substitute symbol and also still doubles the prize. Further, because it is a free game, all wins are trebled. Accordingly, for the winning combination of 5×10 on payline 1, a win of 600 credits is paid which is six times the basic prize of one hundred credits. At this stage, the artwork 28 in the top box 26 remains unchanged.

Figure 7A:
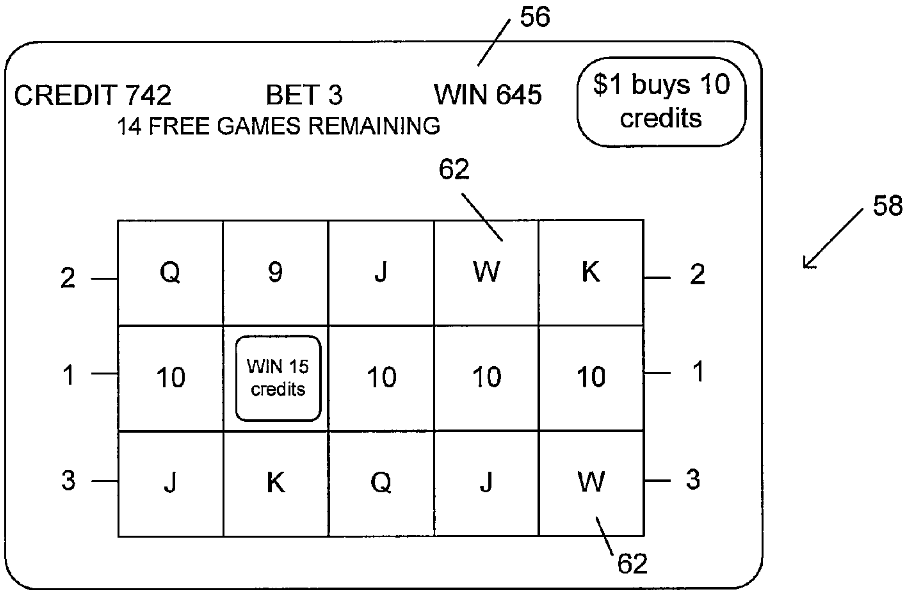
FIGS. 7*a*-7*c* show screen displays after special symbols have been acted on by a player.

Once the win has been incremented on the win meter 56, the CLEOPATRA symbols 62 commence flashing to indicate to the player that they should be touched. When the first CLEOPATRA symbol 62 is touched, it animates to reveal the result dictated by the first position on the chosen pathway 60. This is shown in FIG. 7*a* of the drawings where the first CLEOPATRA symbol has been animated to reveal a prize of fifteen credits, being the first step in the selected pathway 60, part of which is shown in FIG. 13 of the drawings. Once again, the top box artwork remains unchanged.

Figure 7B:
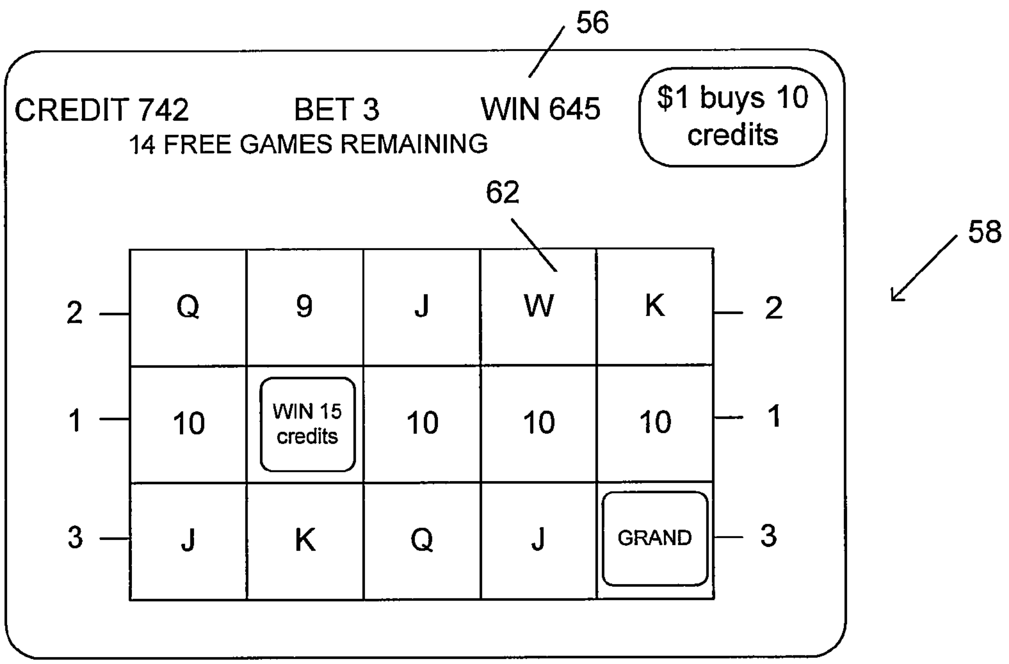
Figure 8A:
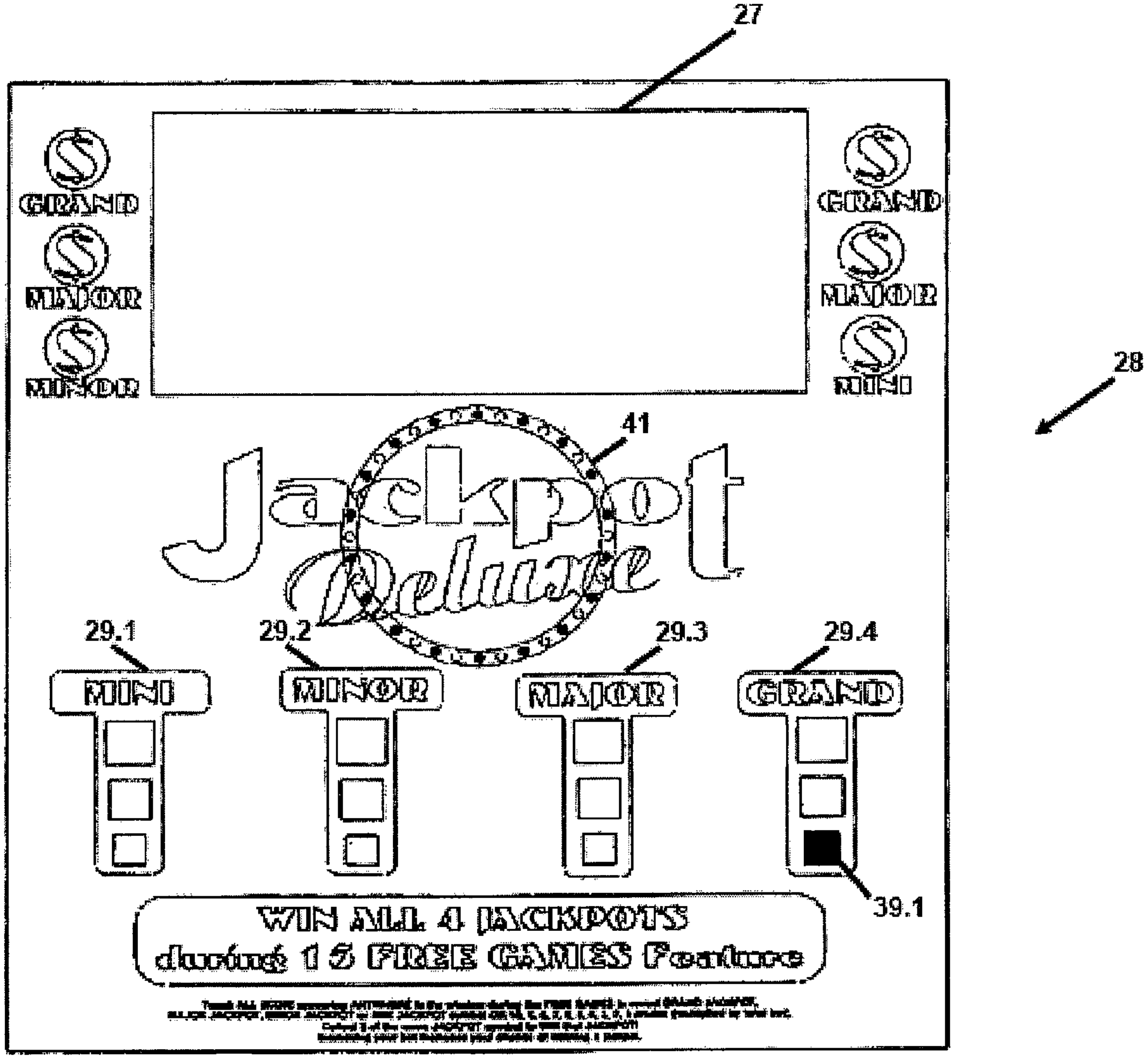
Figure 8B:
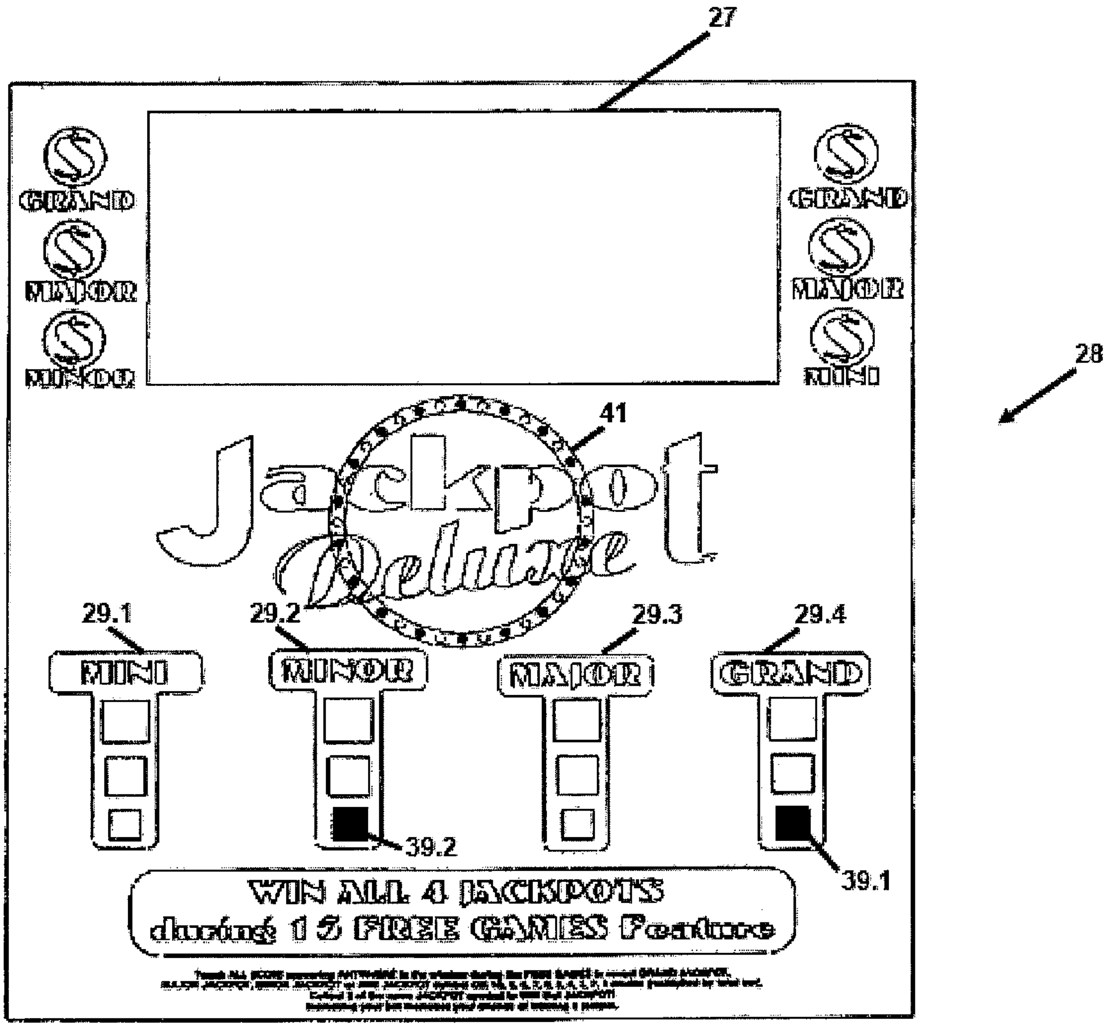

When the second CLEOPATRA symbol 62 has been touched, it animates into a representation of a grand jackpot symbol as shown in FIG. 7*b* of the drawings, being the second step in the selected pathway 60. In this case, the artwork 28 changes so that one of the LED's 39.1 (FIG. 8*a*) under the grand jackpot part 29.4 is illuminated.

Figure 7C:
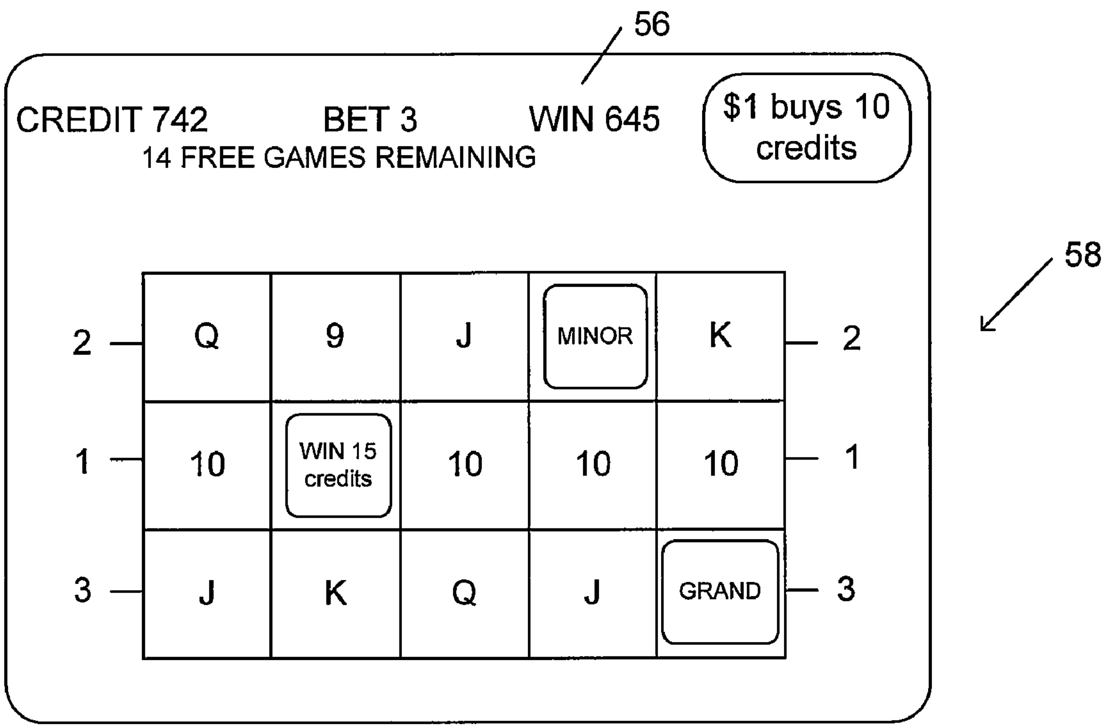

The player then touches the last of the flashing CLEOPATRA symbols and this animates into a minor jackpot symbol as shown in FIG. 7*c* of the drawings, being the third step in the selected pathway 60. Accordingly, a further LED 39.2 illuminates under the minor jackpot part 29.2 of the artwork 28.

Figure 9:
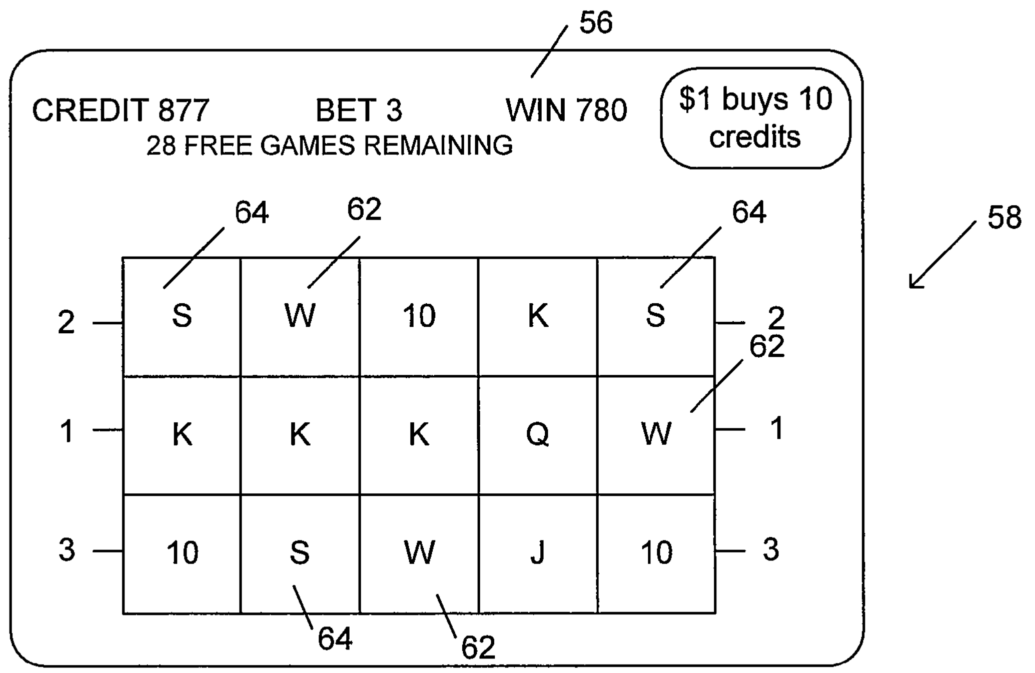
FIG. 9 shows a screen display of a further free game of the bonus game feature.
Figure 10:
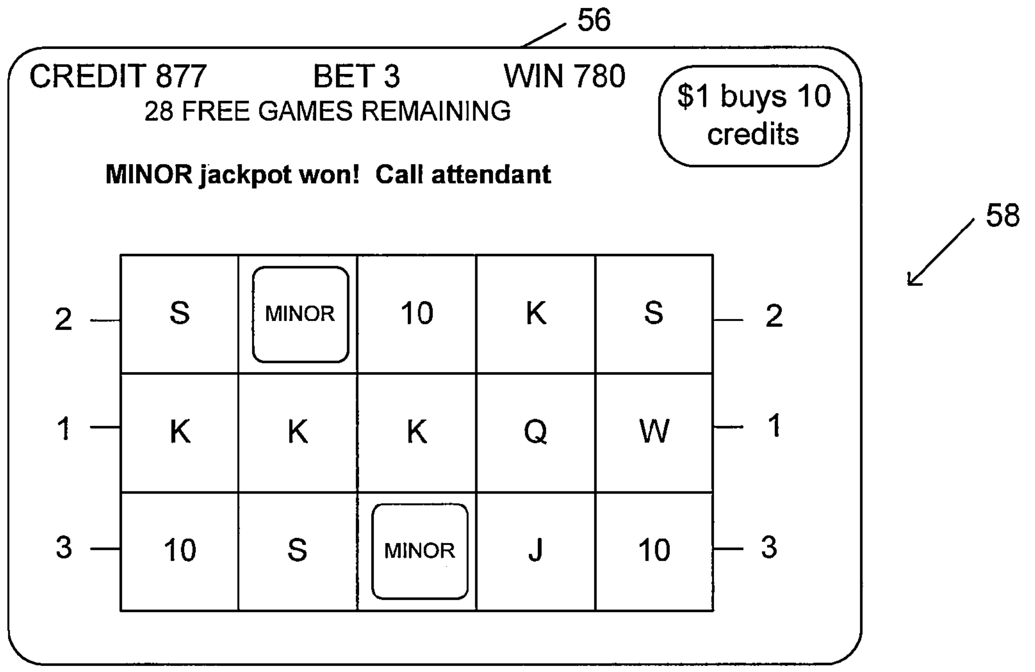
Figure 11:
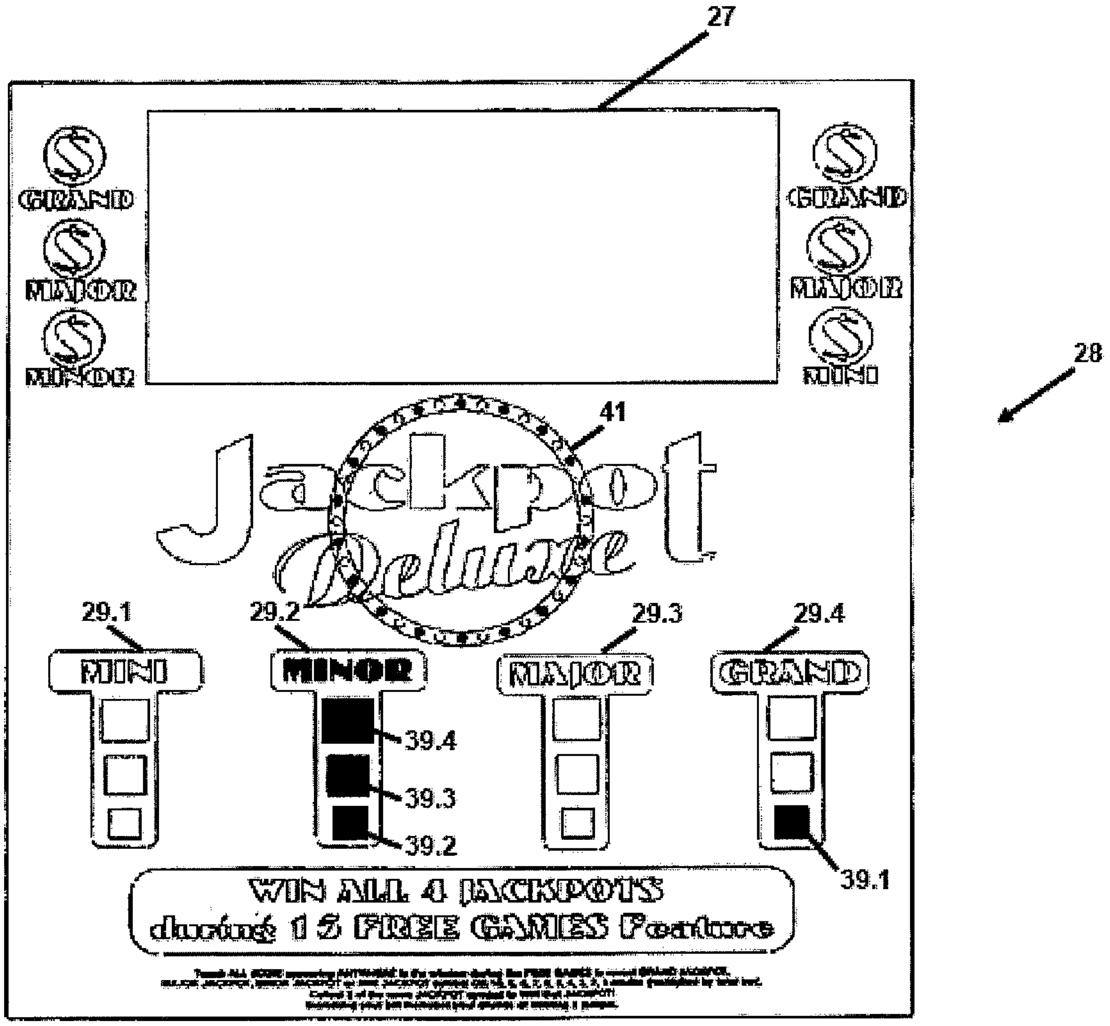
FIG. 11 shows the top box art work after the occurrence of the screen display of FIG. 10.
Figure 14:
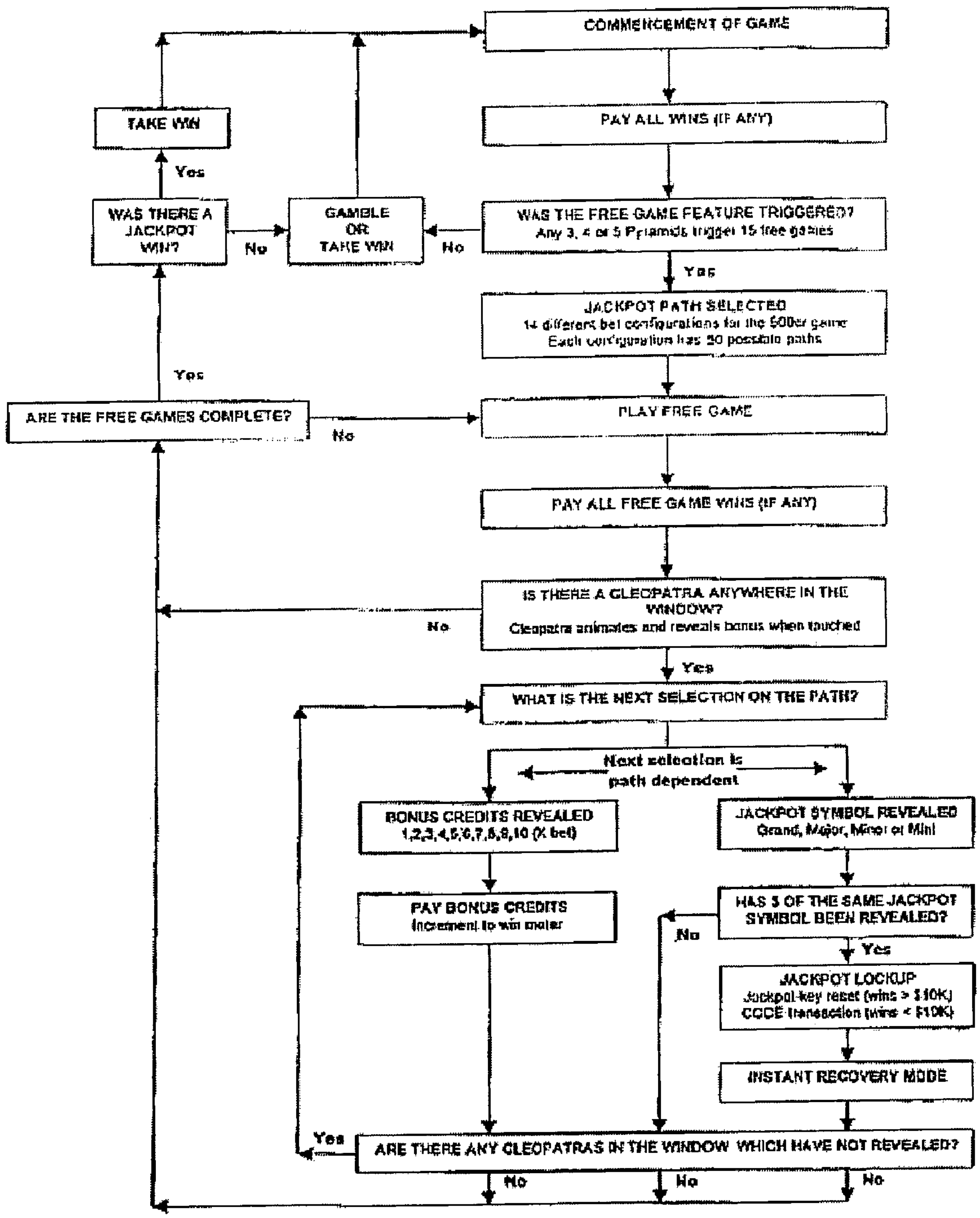
FIG. 14 shows a flow chart of the first embodiment of the game.
Figure 16:
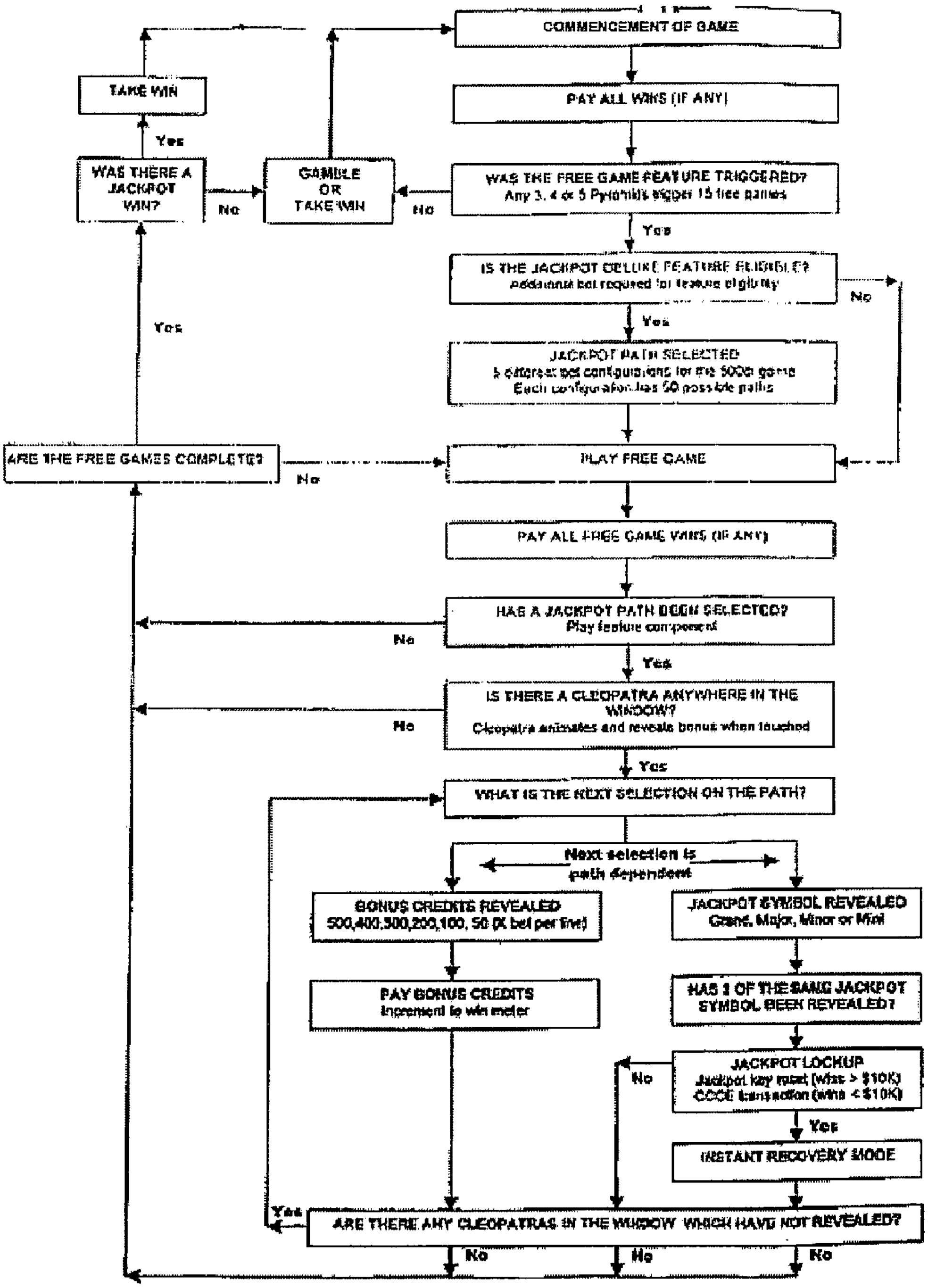
FIG. 16 shows a flow chart of the second embodiment of the game.

Thereafter, the next free game is automatically played. The result of the next free game is shown in FIG. 9 of the drawings. The presence of three PYRAMID symbols 64 causes a further fifteen free games to be awarded leaving 28 free games to be played. In addition, there is a winning combination of 3×K on payline 1 and a prize of 135 credits is credited to the win meter 56, being forty-five credits for the 3×K combination and ninety credits for the 3×PYRAMID symbol 64.

A further three CLEOPATRA symbols 62 are also spun up. Once the win has been incremented on the win meter 56, the CLEOPATRA symbols 62 commence, flashing to indicate to the player that the player must touch them. The player touches the first CLEOPATRA symbol 62 which animates to a minor jackpot symbol causing a second LED 39.3 in the part 29.2 to be illuminated. The player touches the second CLEOPATRA symbol 62 which causes a third minor jackpot symbol to be revealed causing a third LED 39.4 to be energised.

The relevant gaming machine 10 in the system 50 will lock up until an attendant pays and clears the jackpot. The amount that appears on the minor jackpot meter (not shown) in the top box 26 is awarded to the player in addition to the wins that were accumulated throughout the free games. It is to be noted that, after the minor jackpot has been paid, the free game sequence continues and any remaining CLEOPATRA symbols 62 are touched to cause them to animate to reveal special symbol outcomes of the applicable pathway 60. This will continue until all the free games have been played.

It is to be noted that other jackpots may be awarded during the same free game series. After the free games have been completed, the top box 26 is reset to its original appearance without any of the feature areas being lit. It is also to be noted that in certain circumstances, the jackpot prizes could be paid directly to the win and credit meters of the gaming machine 10 rather than having to be paid by an attendant. Also, a double up feature may be offered after the free game sequence has been completed in which case the wins will not increment on to the credit meter until after the double up feature has been completed or has been rejected by the player.

In FIG. 15 of the drawings, showing a second embodiment of the invention, a button 68 is provided where, in order to become eligible for the progressive jackpot feature, an additional bet must be wagered. The eligibility to participate in features is described in the applicant's co-pending patent application no. 65501/00 which is incorporated herein by reference.

If the player initiates a game using one of the five "Play × Lines" buttons then, if the free game feature is triggered, the feature will progress as described above except that the player will not be given the opportunity to touch the CLEOPATRA symbols 62 to reveal special symbol outcomes. The top box art will remain inactivate for the duration of the free games.

If, however, the player makes the additional bet and operates the button 68, the player will be eligible for the progressive jackpot feature as described above. It is to be noted that the provision of the button 68 greatly simplifies the pathways 60 for the game 16 because there are only five different available bets for which numbers of pathways 60 need be provided.

It is a particular advantage of the invention that a progressive jackpot system is provided to which a player has easy access and which provides enhanced player entertainment. The fact that access to a bonus game feature where a jackpot prize potentially could be awarded regardless of the bet made is attractive to players.

The fact that the number of steps taken down a chosen pathway is unpredictable and therefore reduces the predictability of the outcomes encourages the maintenance of player interest.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A gaming system comprising an electronic game controller configured to facilitate a play of a first game, the first game being configured to receive any one of a plurality of different wagers for a first game outcome, to facilitate a play of a second game in response to the first game outcome corresponding to a winning outcome, the second game being configured to receive a sequential selection of a plurality of first symbols, the sequential selection of the first symbols resulting in a plurality of second symbols being revealed, each of the second symbols indicating whether a prize has been won, the electronic game controller is further configured to associate each of the different wagers with a symbol list comprising a plurality of sequentially ordered game symbols, and to select the second symbols from the symbol list associated with the received wager, wherein the game symbols in the symbol list are ordered such that the symbol list results in a probability of the prize being won, and wherein the probability of the symbol list associated with any one of the wagers is different to the probability of the symbol list associated with any other one of the wagers.

2. The gaming system of claim 1, wherein the symbol list associated with one of the wagers is one of a plurality of symbol lists associated with the one of the wagers, wherein the game controller is configured to randomly select the symbol list from the plurality of symbol lists.

3. The gaming system of claim 2, wherein the game symbols in any one of the symbol lists are in a sequential ordering that is different to the sequential ordering of the game symbols in any other one of the symbol lists.

4. The gaming system of claim 1, wherein the prize is one of a plurality of different prizes, and wherein the game symbols in the symbol list comprise a plurality of different symbols each of which corresponds to a unique one of the prizes.

5. The gaming system of claim 4, wherein the different prizes comprise a multi-level progressive jackpot and a fixed monitory value prize.

6. A method for use with a gaming system, the method comprising:

- facilitating on the gaming system a play of a first game, the first game receiving any one of a plurality of different wagers for a first game outcome, wherein each of the different wagers is associated with a symbol list comprising a plurality of sequentially ordered game symbols;
- facilitating on the gaming system a play of a second game in response to the first game outcome corresponding to a winning outcome, the second game receiving a sequential selection of a plurality of first symbols, the sequential selection of the first symbols resulting in a plurality of second symbols indicating whether a prize has been won; and
- using the gaming system, selecting the second symbols from the symbol list associated with one of the wagers that is staked on the first game outcome, wherein the game symbols in the symbol list are ordered such that the symbol list results in a probability of the prize being won, and wherein the probability of the symbol list associated with any one of the wagers is different to the probability of the symbol list associated with any other one of the wagers.

7. The method of claim 6, wherein the symbol list associated with one of the wagers is one of a plurality of symbol lists associated with the one of the wagers, and the method comprising randomly selecting the symbol list from the plurality of symbol lists.

8. The method of claim 7, wherein the game symbols in any one of the symbol lists are in a sequential ordering that is different to the sequential ordering of the game symbols in any other one of the symbol lists.

9. The method of claim 6, wherein the prize is one of a plurality of different prizes, and wherein the game symbols in the symbol list comprise a plurality of different symbols each of which corresponds to a unique one of the prizes.

10. The method of claim 9, wherein the different prizes comprise a multi-level progressive jackpot and a fixed monitory value prize.

* * * * *